US005691738A

United States Patent [19]

Arai et al.

[11] Patent Number: 5,691,738

[45] Date of Patent: Nov. 25, 1997

[54] THIN-FILM ELECTROLUMINESCENT DISPLAY AND METHOD OF FABRICATING SAME

[75] Inventors: Masumi Arai, Okazaki; Nobuei Ito, Chiryu; Tadashi Hattori, Okazaki, all of Japan

[73] Assignee: Nippondenso Co., Ltd., Kariya, Japan

[21] Appl. No.: 413,109

[22] Filed: Mar. 29, 1995

[30] Foreign Application Priority Data

Mar. 30, 1994 [JP] Japan .................................... 6-061417
Feb. 3, 1995 [JP] Japan .................................... 7-017074

[51] Int. Cl.$^6$ ........................................ G06F 3/14

[52] U.S. Cl. ........................................ 345/76; 345/92

[58] Field of Search .............................. 345/33, 76, 92, 345/80, 87; 257/72, 59, 98; 348/800

[56] References Cited

U.S. PATENT DOCUMENTS

| | | | |
|---|---|---|---|
| 3,350,506 | 10/1967 | Chernow | 348/800 |
| 4,227,193 | 10/1980 | Shanks | 345/76 |

FOREIGN PATENT DOCUMENTS

| | | |
|---|---|---|
| 57-136675 | 8/1982 | Japan . |
| 62-212693 | 9/1987 | Japan . |
| 3133093 | 6/1991 | Japan . |
| 3100397 | 10/1991 | Japan . |
| 3225794 | 10/1991 | Japan . |
| 380314 | 12/1991 | Japan . |
| 5198375 | 8/1993 | Japan . |

OTHER PUBLICATIONS

Okamoto, et al: "Character Display Devices using Electoluminescent Panels", Research Report of Tottori University Department of Technology, vol. 8, pp. 81–95, May 31, 1977.

*Primary Examiner*—Victor R. Kostak
*Attorney, Agent, or Firm*—Cushman, Darby & Cushman IP Group of Pillsbury Madison & Sutro LLP

[57] ABSTRACT

A thin film electroluminescent display is capable of effectively preventing dielectric breakdown between both electrodes. A first transparent electrode layer, a first dielectric layer, a luminescent layer, a second dielectric layer, and a second transparent electrode layer are laminated in that order on a first glass substrate to form a first light-emitting element. A second light-emitting element is fabricated in substantially the same way. A voltage is applied between the first and second electrode layers to cause the luminescent layers between both electrode layers to emit. As a result, desired characters are displayed. Those corners of the first and second electrodes disposed opposite to each other which are located within the planes of the electrode layers have round portions. The radius of circle of these round portions is in excess of a given value. This prevents concentration of the electric field on the corners of the electrodes.

19 Claims, 8 Drawing Sheets

THIN-FILM ELECTROLUMINESCENT DISPLAY AND METHOD OF FABRICATING SAME

CROSS-REFERENCE TO RELATED APPLICATIONS

This application is related to and claims priority under 35 U.S.C. §119 from Japanese Patent Application Nos. Hei. 6-61417 and Hei. 7-17074, the contents of which are hereby incorporated by reference.

BACKGROUND OF THE INVENTION

1. Field of the Invention

The present invention relates to a thin-film electroluminescent display which can be used in various types of display devices such as a display device installed on a vehicle, a display device for use with an information-processing apparatus, and a time display device.

2. Description of the Related Art

A known self-luminous flat-panel display as described in Japanese Patent Laid-Open No. Hei. 3-80314 is a thin-film electroluminescent display having a laminated construction. This display includes a transparent substrate made of glass. A first transparent electrode layer is formed on the substrate. A dielectric layer is formed on the first electrode layer. A luminescent layer in the form of a thin film is formed on the dielectric layer. An element acting as luminescent centers is added to the luminescent layer. A second electrode layer is formed over the luminescent layer via a second dielectric layer.

In the above-described conventional device, an AC voltage is applied between selected first and second electrodes to apply an AC electric field to the luminescent layer between both electrode layers. The activated luminescent layer portions glow brightly, thus displaying characters or graphic images. The AC voltage applied between the electrodes is relatively high, e.g., about 250 V.

In the above-described device (shown in FIG. 10), the electric field tends to be concentrated on the portions of the display at which the first and second electrodes, 31 and 35, respectively, face each other, i.e., the corners C within the plane of the luminescent layer as shown in FIG. 11, because the corners C are quite sharp. Also, dielectric breakdown occurs in the first and second dielectric layers or in the luminescent layer at the corners C.

SUMMARY OF THE INVENTION

In view of the foregoing, a main object of the present invention is to provide a thin-film electroluminescent (EL) display capable of effectively protecting dielectric layer and luminescent layer sandwiched between two electrodes against dielectric breakdown.

In a preferred embodiment, a thin-film electroluminescent (EL) display according to one aspect of the present invention includes a substrate and a light-emitting element formed by a first electrode layer, a first dielectric layer, a luminescent layer, a second dielectric layer, and a second electrode layer laminated in that order on the substrate. A voltage is applied between the first electrode layer and the second electrode layer to cause the luminescent layer to emit light. The first electrode layer forms first electrodes having corners within a plane defined by the first electrode layer. The second electrode layer forms second electrodes having corners located within a plane defined by the second electrode layer. The corners of the second electrodes are located opposite the corners of the first electrodes. This electroluminescent display is characterized in that the corners of the first and second electrodes opposite one another have round portions having a radius of circle in excess of a given value, e.g., 10 μm.

Preferably, electrode connector portions connected with the first electrodes or the second electrodes via junction portions which are wider than the electrode connector portions are provided in the device. Also, the first and second electrodes may form segments of images capable of being displayed.

Further, it is possible that the electroluminescent display has a display portion in which the light-emitting element is located and a non-display portion in which the light-emitting element is not located, that the electrode connector portions are brought out to the non-display portion; and that metallic conductive portions having a lower resistance than the electrode connector portions are formed on those regions of the electrode connector portions which are located in the non-display portion.

A thin-film EL display according to another aspect of the present invention includes a first substrate; a first light-emitting element formed by a first electrode layer, a first dielectric layer, a luminescent layer, a second dielectric layer, and a second electrode layer laminated in that order on the first substrate; a second substrate; a second light-emitting element formed by a first electrode layer, a first dielectric layer, a luminescent layer, a second dielectric layer, and a second electrode layer laminated in that order on the second substrate; an inner space which is formed between the first and second substrate layers and in which the first and second light-emitting elements are located opposite to each other; sealing portions for sealing together the first and second substrates such that the inner space is hermetically isolated from outside; the first electrode layer forming first electrodes having corners within a plane defined by the first electrode layer; the second electrode layer forming second electrodes having corners located within a plane defined by the second electrode layer, the corners of the second electrodes being located opposite to the corners of the first electrodes; and a device for applying a voltage between the first electrode layer and the second electrode layer of each of the first and second light-emitting elements to cause the luminescent layers to emit light. This device is characterized in that the corners of the first and second electrodes opposite to each other have round portions having a radius of circle in excess of a given value, e.g., 10 μm.

In this device, it is possible that the first and second substrates have electrode connector portions connected with the first or second electrodes of each of the first and second light-emitting elements. Also, the substrate or substrates may be transparent.

According to another aspect of the present invention, a method of manufacturing the above-referenced device includes the steps of placing the first and second substrates in such a way that the inner space is formed therebetween; forming the sealing portions in such a way that injection ports for injecting a dielectric fluid into the inner space are formed in the sealing portions and that the injection ports are located outside the connector terminal portions; injecting the dielectric fluid into the inner space through the injection ports; and then closing off the injection ports by the sealing portions. Also, it is possible that the substrate or substrates are transparent.

Preferably in the above-described devices, the corners of the first and second electrodes opposite each other have round portions having a radius in excess of a given value. Therefore, electric field concentration on the corners can be circumvented. In consequence, dielectric breakdown in the dielectric layer and luminescent layer located between both electrode layers can be suppressed.

Preferably, electrode connector portions connected with the first electrodes or the second electrodes via junction portions which are wider than the electrode connector portions are provided in the device. Therefore, the electric field distribution at the connector portions can be made more uniform than in the above-described prior art structure (described in the above-cited Japanese Patent Laid-Open No. Hei. 3-80314) where narrow electrode connector portions are directly connected with electrodes. Hence, electric field concentration is less likely to occur. As shown in FIG. 10, which shows the cross-section of the end portion E of a first electrode 31 according to the prior art as shown in FIG. 11, electric field concentration in a first insulating layer 32, a light emitting layer 33 and a second insulating layer 34, all of which are between first and second electrodes 31 and 35, can be prevented.

Further, the first and second electrodes may form segments of images capable of being displayed; thus, the area of each electrode is decreased, thereby reducing the electrostatic capacitance between adjacent electrodes, thus reducing a driving current flowing into each electrode. This makes it possible to reduce the current capacity of the driver circuit. Thus, the driver circuit can be reduced in size. If a dielectric breakdown takes place between adjacent electrodes, the dielectric breakdown can be restricted to a minimal area.

Preferably, those regions of the electrode connector portions which are located in the non-display portion are provided with metallic conductive portions of lower resistance than the electrode connector portions. Therefore, the resistance of the electrode connector portions can be substantially reduced. The voltage drop across each electrode connector portion located in the non-display portion can be reduced. Consequently, voltage drop variations due to the differences among the lengths of the electrode connector portions extending to the electrodes can be decreased. As a result, nonuniformity of the emission brightness on the display portion formed by the electrodes can be eliminated.

Also, the injection ports may be formed outside the connector terminal portions. Therefore, when lead wires are connected to the connector terminal portions, the sealing portions for the injection ports do not adversely affect the connection work.

Other objects and features of the invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PRESENTLY PREFERRED EXEMPLARY EMBODIMENTS

The preferred embodiments of the present invention are hereinafter described with reference to the accompanying drawings.

Figure 3:
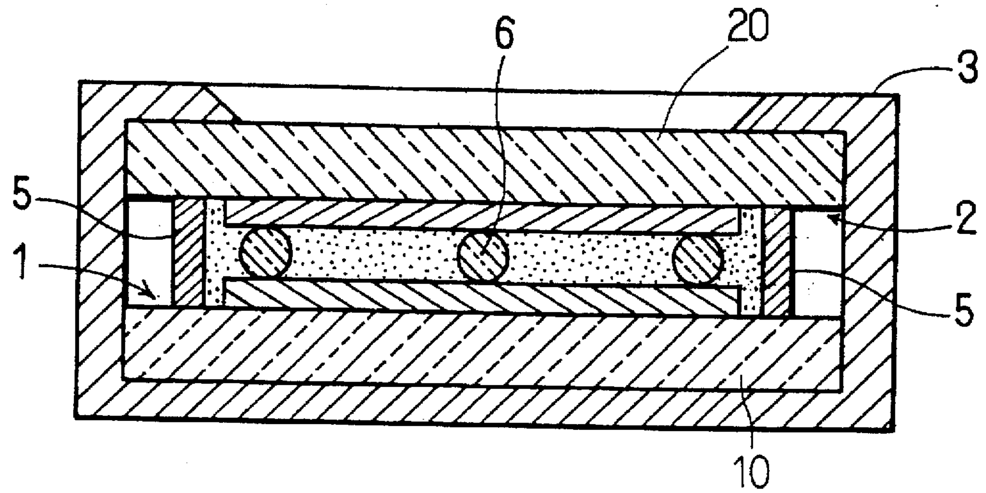
FIG. 3 is a schematic cross-sectional view of the time display device shown in FIG. 2.

As schematically shown in FIG. 3, this time display device comprises a first thin-film electroluminescent display element 1 and a second thin-film electroluminescent display element 2 which are placed on top of each other and sealed together by an adhesive as described later. A frame 3 is mounted on the outer periphery of this lamination of the two display elements 1 and 2. The first EL display element 1 mainly acts to display numerals. The second EL display element 2 mainly acts to display the second hand.

Figure 4:
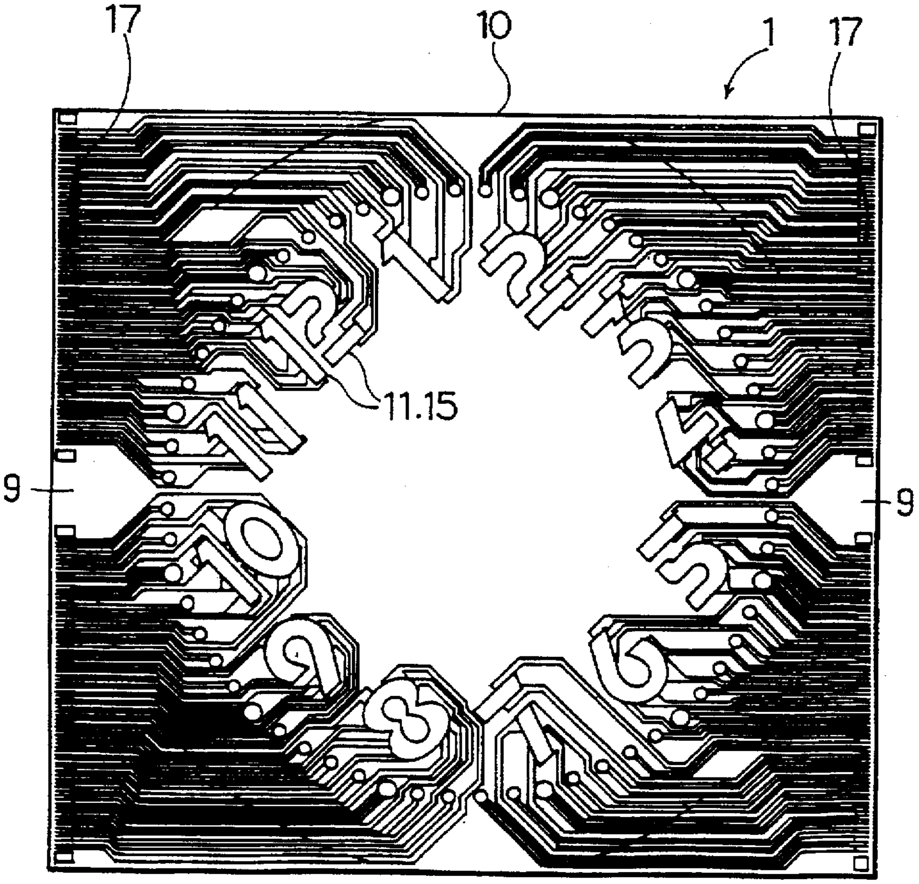
FIG. 4 is a front elevation view of a first thin-film electro-luminescent display element according to the embodiment.
Figure 6:
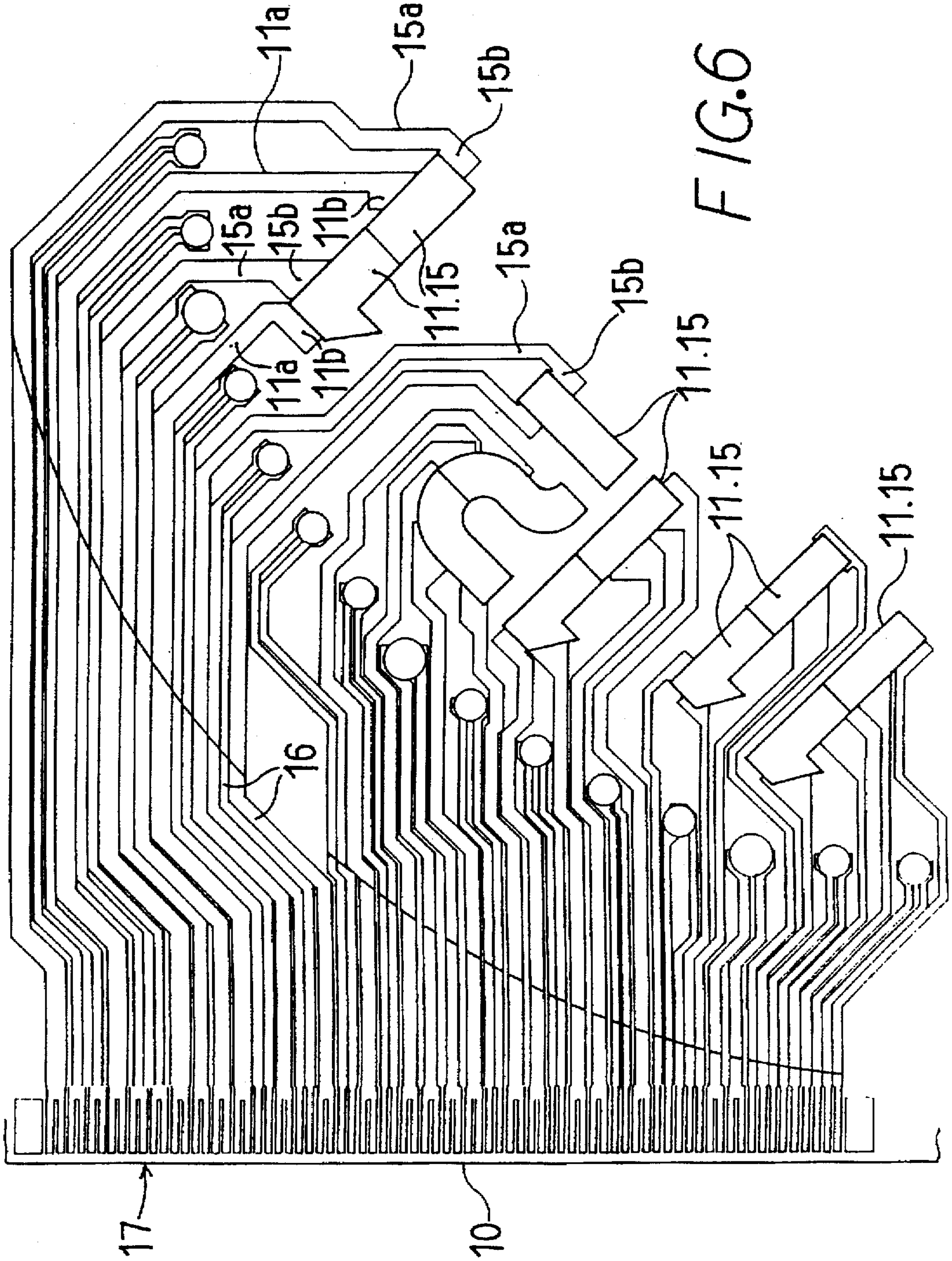
FIG. 6 is a fragmentary enlarged front elevational view of the first thin-film electroluminescent display element shown in FIG. 4.
Figure 8:
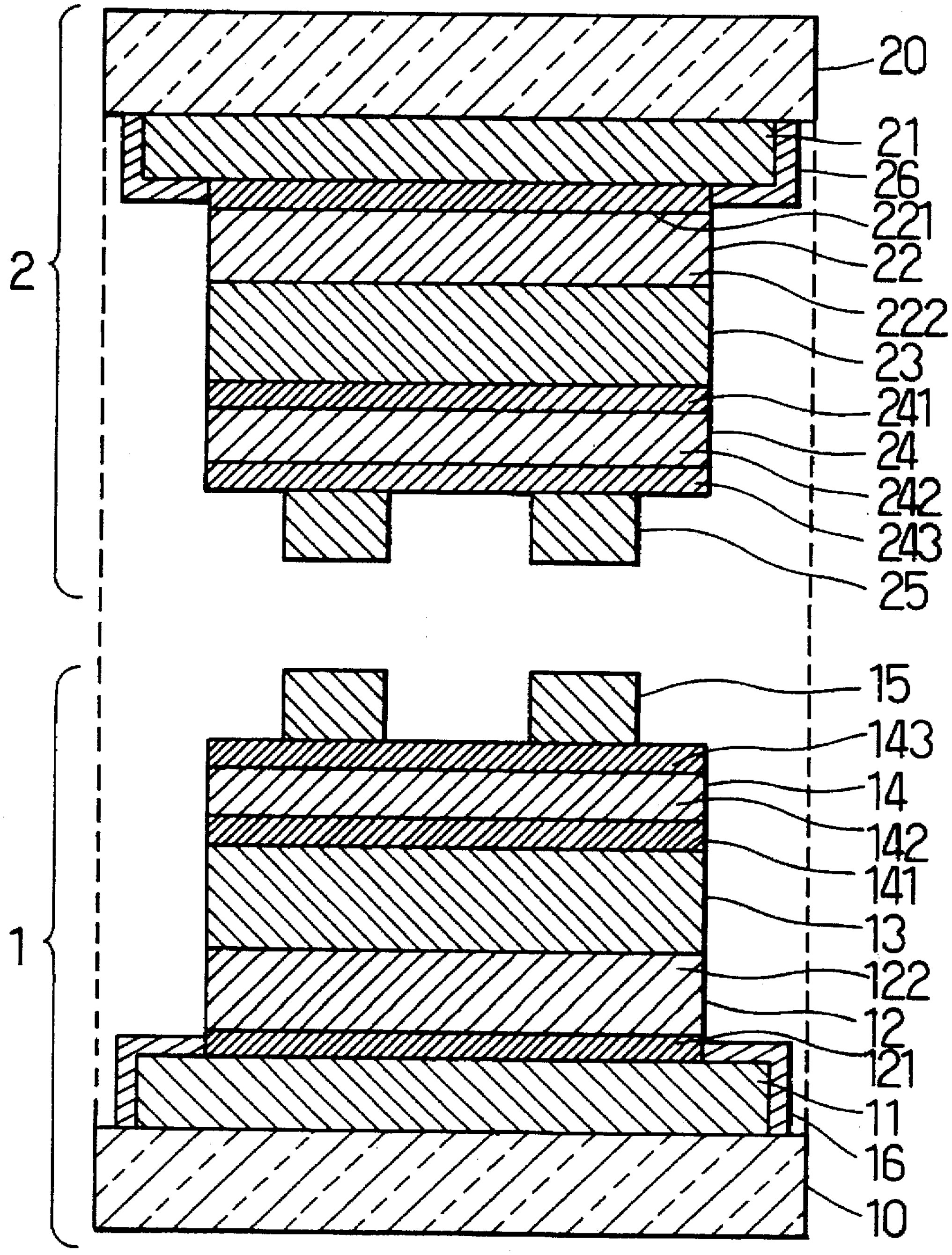
FIG. 8 is a schematic cross sectional view of the first thin-film electroluminescent display element and the second thin-film electroluminescent display element.

The first thin-film EL display element 1 for displaying numerals and dots used to display the minute is constructed as follows. As schematically shown in FIG. 8, the first transparent electrode layer 11 is formed out of ITO (indium-tin oxide) on a glass substrate 10. A first dielectric layer 12 is formed on the first electrode layer 11. A luminescent layer 13 made from ZnS-Mn is formed on the first dielectric layer 12. A second dielectric layer 14 is formed on the luminescent layer 13. Then, a second transparent electrode layer 15 is formed out of ITO on the second dielectric layer 14. Thus, the first thin-film EL display element 1 is completed. The first dielectric layer 12 consists of a dielectric layer 121 made from SiON and a dielectric layer 22 made from a mixture of $Ta_2O_5$ and $Al_2O_3$. The second dielectric layer 14 is composed of a dielectric layer 141 made from SiON, a dielectric layer 142 made from a mixture of $Ta_2O_5$ and $Al_2O_3$, and a dielectric layer 143 made from SiON. The transparent electrode layers 11, 15, the luminescent layer 3, and the dielectric layers 12, 14 together form a light-emitting element. As shown in FIGS. 4 and 6, in the first thin-film EL display element 1, the first transparent electrodes 11 and the second transparent electrodes 15 are shaped into segments of various characters and dots to be displayed. Each character is made up of 2 to 4 segments. The area of each segment is less than about 100 $mm^2$, for example. The spacing between the adjacent segments is set to less than 80 μm so that the spaces are indiscernible when a display is provided. Electrode connector portions 11*a* and 15*a* are made from the same material, e.g., ITO, ZnO, or the like, as the first and second transparent electrodes 11 and 15, respectively, and fabricated integrally with the first and second electrodes 11 and 15, respectively. These electrode connector portions 11*a* and 15*a* extend outwardly from the first and second electrodes 11 and 15, respectively. The front ends of the electrode connector portions 11*a* and 15*a* are connected with their respective terminals of connector terminal portions 17 mounted at ends of the glass substrate 10.

Junction portions 11*b* and 15*b* between the first and second transparent electrodes 11 and 15 and the electrode connector portions 11*a* and 15*a*, respectively, are wider than the electrode connector portions 11*a* and 15*a*, as shown in FIG. 6.

Figure 1:
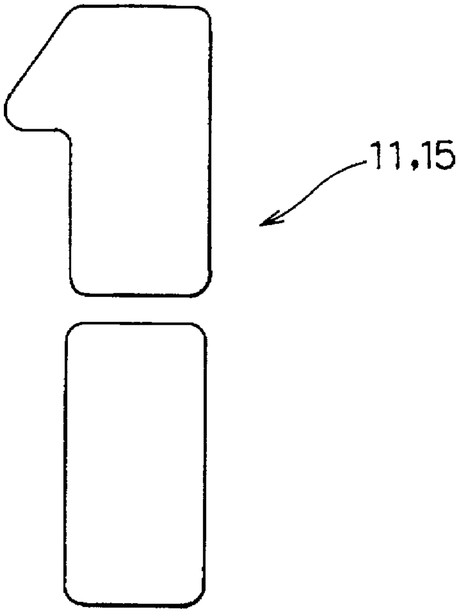
FIG. 1 is a front elevation view of electrodes used in a display device according to a first preferred embodiment of the present invention.

The corners of the first transparent electrodes 11, the second transparent electrodes 15, and electrode connector portions 11*a*, 15*a* are rounded at a radius of more than 20 μm, as shown in FIG. 1.

Figure 2:
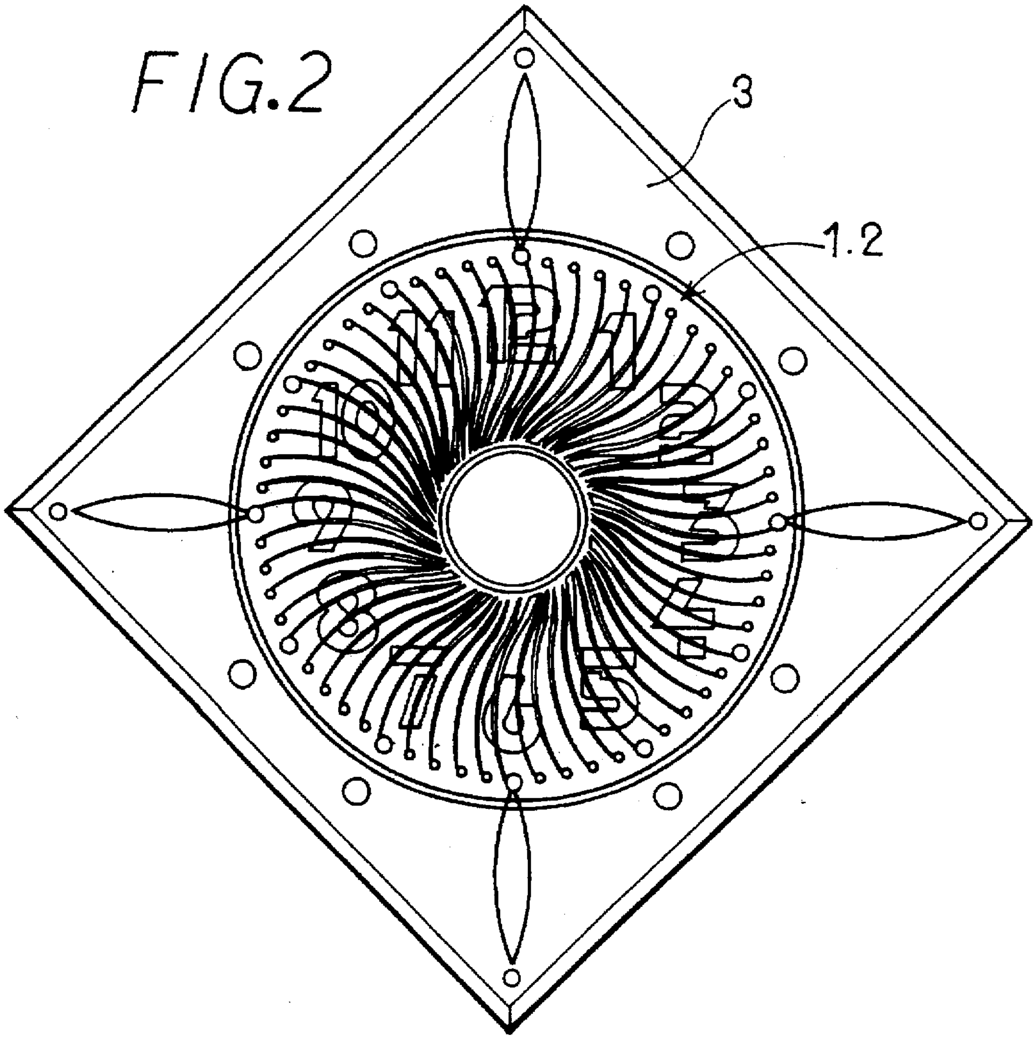
FIG. 2 is a front elevation view of the display device having the electrodes shown in FIG. 1.

The time display device acting as a thin-film electroluminescent display is composed of a display portion in which the aforementioned light-emitting element is mounted and a non-display portion in which the light-emitting element is not mounted. Metallic conductive portions 16 of low electrical resistance are formed on those portions of the electrode connector portions 11*a* and 15*a* which are concealed by the frame 3 (FIGS. 2 and 3) and which do not appear on the display portion, i.e., on the surface of the portion located on the non-display portion. The metallic conductive portions 16 are made of a metal such as Ni, Al, Au, W, Mo, Ti, Cr, or Cu having an electrical resistance smaller than that of the material (i.e., ITO or ZnO) of the first and second transparent electrodes, 11 and 15, respectively.

The second thin-film EL display element 2 shown in FIGS. 5 and 7 which displays the second hand and dots for creating characters is constructed in the manner described below with reference to FIG. 8. In the same manner as in the fabrication of the first thin-film EL display element 1, a first transparent electrode layer 21 is formed out of ITO on a glass substrate 20. A first dielectric layer 22 is formed on the first transparent electrode layer 21. A luminescent layer 23 is formed out of ZnS-TbOF on the first dielectric layer 22. A second dielectric layer 24 is formed on the luminescent layer 23. Then, a second transparent electrode layer 25 is formed out of ITO on the second dielectric layer 24. The first dielectric layer 22 consists of a dielectric layer 221 of SiON and a dielectric layer 222 made from a mixture of $Ta_2O_5$ and $Al_2O_3$. The second dielectric layer 24 is composed of a dielectric layer 241 made from SiON, a dielectric layer 242 made from a mixture of $Ta_2O_5$ and $Al_2O_3$, and a dielectric layer 243 made from SiON. The transparent electrodes 21, 25, the luminescent layer 23, and the dielectric layers 22, 24 together form a light-emitting element.

Figure 5:
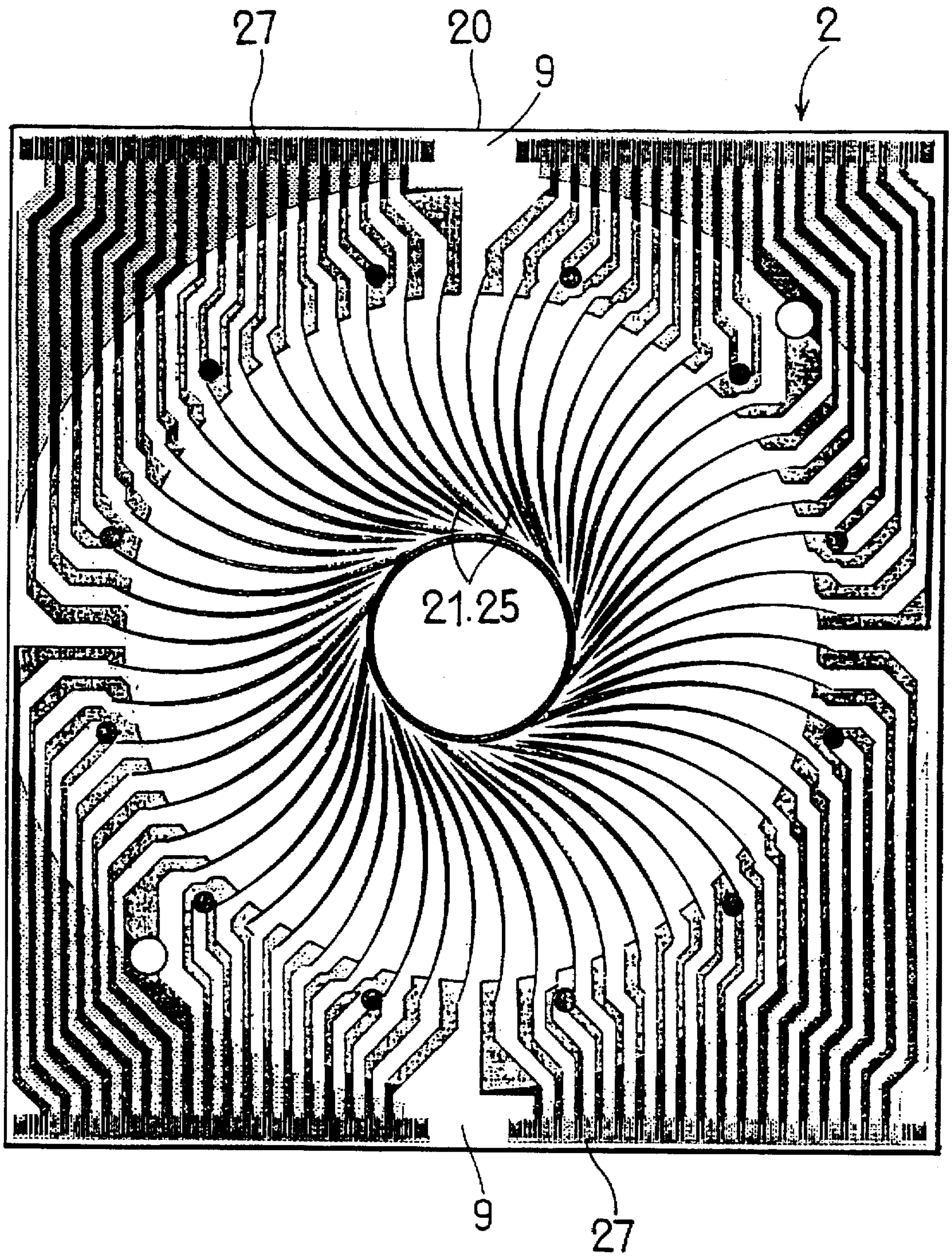
FIG. 5 is a front elevation view of a second thin-film electro-luminescent display element according to the embodiment.
Figure 7:
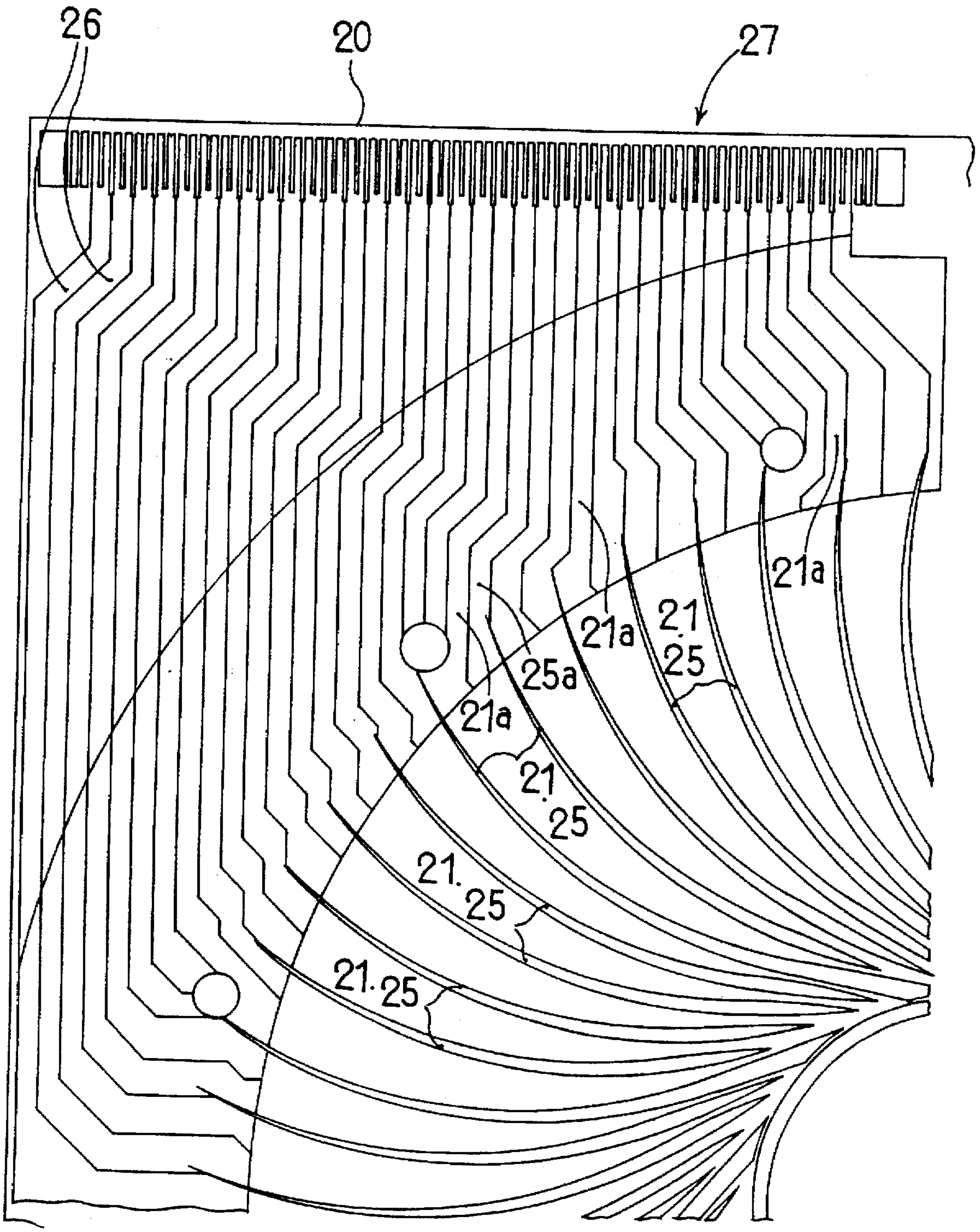
FIG. 7 is a fragmentary enlarged front elevational view of the second thin-film electroluminescent display element shown in FIG. 5.

As shown in FIGS. 5 and 7, in the second thin-film EL display element, the first transparent electrodes 21 and the second transparent electrodes 25 are shaped into second hands to be displayed (radially arranged curves) and into dots.

Electrode connector portions 21*a* and 25*a* are formed integrally with the first and second transparent electrodes 21 and 25, respectively, and extend from these electrodes 21 and 25, respectively. The front ends of the electrode connector portions 21*a* and 25*a* are electrically connected with their respective terminals of connector terminal portions 27 mounted at ends of the glass substrate 20.

As shown in FIGS. 7 and 8, metallic conductive portions 26 of low electrical resistance are formed on those portions of the electrode connector portions 21*a* and 25*a* which are concealed by the frame 3 and thus do not appear on the display portion. The metallic conductive portions 26 are made from the same material as the first EL display element 1.

The first thin-film EL display element 1 and the second thin-film EL display element 2 are sealed together by an adhesive in the manner described below. A resinous adhesive 5 (FIG. 3) is applied to the inner fringes of any one of the glass substrates 10 and 20 of the device elements 1 and 2, thus forming sealing portions.

An inner space 7 is left between the display elements 1 and 2. A multiplicity of spacers 6 (FIG. 3) such as glass beads or granular hard plastics are positioned in the inner space 7 between the second dielectric layers 14 and 24 of the display device elements 1 and 2, respectively, to maintain a constant spacing between the glass substrates 10 and 20. The glass substrates 10 and 20 are placed on top of each other so that the connector terminal portions 17 and 27 shown in FIGS. 4 and 5 are oriented in alternating directions. The glass substrates 10 and 20 are sealed together by the resinous adhesive 5. At this time, the adhesive 5 is not attached to locations lying outside the connector terminal portions 17 and 27 of the device elements 1 and 2. Thus, injection ports 9 (shown in FIGS. 4 and 5) for injecting silicone oil acting as a dielectric fluid into the inner space 7 are formed. Then, the silicone oil is injected into the inner space 7 through the injection ports 9 in a vacuum. Thereafter, the injection ports 9 are closed off by the resinous adhesive 5.

Since the injection ports 9 are located outside the connector terminal portions 17 and 27 in this way, the sealing portions consisting of the resinous adhesive do not adversely affect electrical connections of lead wires (not shown) with the connector terminal portions 17 and 27 when such connections are made.

As can be understood from the description made thus far, the sealing portions closing off the injection ports appear neither on the front surface nor on the rear surface of the body of the time display device, because the injection ports 9 extend in the direction of thickness of the body. Hence, the appearance of the device is not limited by the injection ports.

A specific example of fabrication of the first thin-film EL display element 1 and the second thin-film EL display element 2 is described below.

First, the first transparent electrode layers 11, 21 and the electrode connector portions 11*a*, 21*a* are formed out of ITO (indium-tin oxide) on the glass substrates 10 and 20, respectively, by vacuum evaporation. The ITO material takes the form of pellets which are prepared by mixing tin oxide ($SnO_2$) into indium oxide ($In_2O_3$) such that the ratio of In atoms to Sn atoms is 95:5, then shaping the mixture into the pellet forms, and baking them.

The glass substrates 10, 20, and the pellets are placed inside an electron beam evaporation machine. The inside of the vacuum vessel in the evaporation machine is evacuated to $3\times10^{-4}$ Pa while maintaining the temperature of the glass substrates 10 and 20 at 250° C.

Then, $O_2$ gas is admitted up to a pressure of $6.7\times10^{-2}$ Pa. ITO is deposited as a transparent conductive film to a thickness of 200 nm while adjusting the electron beam output such that the evaporation rate is 0.1 to 0.3 nm/sec.

Then, this ITO transparent conductive film is photolithographically patterned into the first transparent electrodes 11, 21, the electrode connector portions 11*a*, 21*a*, and their junction portions 11*b*, 21*b* shaped as shown in FIGS. 4–7 by a wet etching process, using hydrochloric acid (HCl).

The first dielectric layers 12 and 22 are formed by RF sputtering over the glass substrates 10 and 20, respectively, on which the first transparent electrodes 11, 21, the electrode connector portions 11*a*, 21*a*, and their junction portions 11*b*, 21*b* are formed. The first dielectric layer 12 consists of a dielectric layer 121 of SiON and a dielectric layer 122 that is made from a mixture of tantalum pentoxide ($Ta_2O_5$) and aluminum oxide ($Al_2O_3$). Similarly, the first dielectric layer 22 consists of a dielectric layer 221 of SiON and a dielectric layer 222 that is made from a mixture of tantalum pentoxide ($Ta_2O_5$) and aluminum oxide ($Al_2O_3$).

More specifically, the glass substrates 10 and 20 on which the first transparent electrodes 11 and 21 are respectively formed are placed in position within the sputtering machine and maintained at 200° C. for 30 minutes. The inside of the vacuum vessel is evacuated to $3\times10^{-4}$ Pa.

Then, Ar gas is introduced into the vacuum vessel at a rate of 105 cc/min. $O_2$ gas is admitted into the vessel at a rate of 5 cc/min. $N_2$ gas is forced into the vessel at a rate of 400 cc/min. At the same time, the evacuation valve is adjusted to set the pressure inside the vacuum vessel of the sputtering machine to 0.5 Pa. A target consisting of silicon (Si) is used. RF power is supplied to the target at 3.2 W/cm$^2$. A presputtering operation is carried out for 10 minutes, and then the silicon is deposited up to a thickness of 100 nm. Thereafter, a target consisting of a baked mixture of tantalum pentoxide ($Ta_2O_5$) and aluminum oxide ($Al_2O_3$) is used. Ar gas is introduced at a rate of 140 cc/min into the vacuum vessel. $O_2$ gas is admitted at a rate of 60 cc/min into the vessel. At the same time, the evacuation valve is adjusted to set the pressure inside the vacuum vessel to 0.6 Pa. RF power is supplied to the target at 4.2 W/cm$^2$. A presputtering operation is carried out for 10 minutes, and then the silicon is deposited up to a thickness of 300 nm to successively form the first dielectric layers 12 and 22.

With respect to the first thin-film EL display element 1, zinc sulfide:manganese (ZnS:Mn) is evaporated onto the first dielectric layer 12 up to a thickness of 600 nm. As luminescent centers, 0.8% by weight of manganese (Mn) emitting yellow-orange light is added to the zinc sulfide to prepare the material ZnS:Mn. In this way, the luminescent layer 13 is formed. In particular, the glass substrate 10 is maintained at a temperature of 200° C. The inside of the electron beam evaporation machine is maintained at $5\times10^{-4}$ Pa. The material is deposited at a rate of 0.1 to 0.3 nm/sec.

With respect to the second thin-film EL display element 2, the luminescent layer 23 is formed on the first dielectric layer 22 to a thickness of 700 nm by RF sputtering, using a baked target of the mixture. This mixture consists principally of zinc sulfide (ZnS) to which 3.6% by weight of fluoride oxide terbium (TbOF) emitting green light is added as luminescent centers.

More specifically, the temperature of the glass substrate 20 is maintained at 250° C. RF power of 2 W/cm$^2$ is supplied to the sputtering target in an ambient mixture of Ar and He at a gas pressure of 4 Pa, thus forming the film.

Then, the dielectric layers 141 and 241 of SiON are formed to a thickness of 100 nm on the luminescent layers 13 and 23, respectively, in the same way as the first dielectric layers 12 and 22. Consecutively, the dielectric layers 142 and 242 of $Ta_2O_5\bullet Al_2O_3$ are formed to a thickness of 300 mm. Then, the dielectric layers 143 and 243 of SiON are formed on them to a thickness of 100 nm. In this way, the second dielectric layers 14 and 24 are formed. The first and second dielectric layers are formed under the same conditions. The film thicknesses are adjusted, depending on the speed at which the substrates are conveyed and on the number of repetitions of the film formation process.

Then, the second transparent electrode layers 15, 25, the electrode connector portions 15*a*, 25*a*, and their junction portions 15*b*, 25*b* are formed on the second dielectric layers 14 and 24, respectively. That is, the first transparent electrodes 11, 21 and the electrode connector portions 11*a*, 21*a* are formed in the same way as the first transparent electrodes 11, 21, the electrode connector portions 11*a*, 21*a*, and their junction portions 11*b*, 21*b*. They are etched into desired patterns, using glass masks having the desired patterns.

Thereafter, metallic conductive portions 16 and 26 of low electrical resistance are formed on those portions of the electrode connector portions 11*a*, 15*a*, 21*a*, 25*a* of the first transparent electrodes 11, 21 and of the second transparent electrodes 15, 25 which cannot be seen from the outside because they are concealed by the frame 3 of the timepiece. The metallic conductive portions 16 and 26 are made of nickel (Ni) of high purity.

More specifically, the glass substrates 10 and 20 on which the electrode connector portions 11*a*, 15*a*, 21*a*, 25*a* are formed and the evaporation material, e.g., nickel, are placed in position within the electron beam evaporation machine. The inside of the vacuum vessel is evacuated below $6.7\times10^{-4}$ Pa. Then, the output of the electron beam is adjusted so that the film deposition rate becomes more than 3 nm/sec. The film is grown to a thickness of 500 nm. The metal conductive portions 16 and 26 are photolithographically patterned into desired forms on the surfaces of the electrode connector portions 11*a*, 15*a*, 21*a*, 25*a* by a wet etching process using nitric acid ($H_2NO_3$).

Then, the connector terminal portions 17 and 27 for connection with an external driver circuit are formed at ends of the metal conductive portions 16 and 26, respectively. The connector terminal portions 17 and 27 are made of gold (Au) of high purity.

More specifically, the glass substrates 10 and 20 on which the metal conductive portions 16 and 26 are respectively formed and the evaporation material are placed in position within the electron beam evaporation machine. The inside of the vacuum vessel is evacuated below $6.7\times10^{-4}$ Pa. Then, the output of the electron beam is adjusted so that the film deposition rate becomes more than 3 nm/sec. The film is grown to a thickness of 150 nm. The connector terminal portions 17 and 27 of desired forms are formed by photolithography and by wet etching, using water solution of ammonia iodide ($NH_4I$) or the like.

In the time display device constructed in this way, its connector terminal portions 17 and 27 are connected with the driver circuit (not shown) via lead wires. On receiving a control signal from a clock circuit, the driver circuit applies an RF AC voltage of 250 V between the first and second transparent electrodes 11 and 15 of the first EL display element 1 and between the first and second transparent electrodes 21 and 25 of the second EL display element 2. The luminescent layers 13 and 23 between the activated electrodes emit light, causing characters for expressing the time to emit orange-yellow light. Also, dots for expressing minutes emit orange-yellow light. The second hand for expressing seconds emits green light. In this way, the time is displayed.

Figure 9:
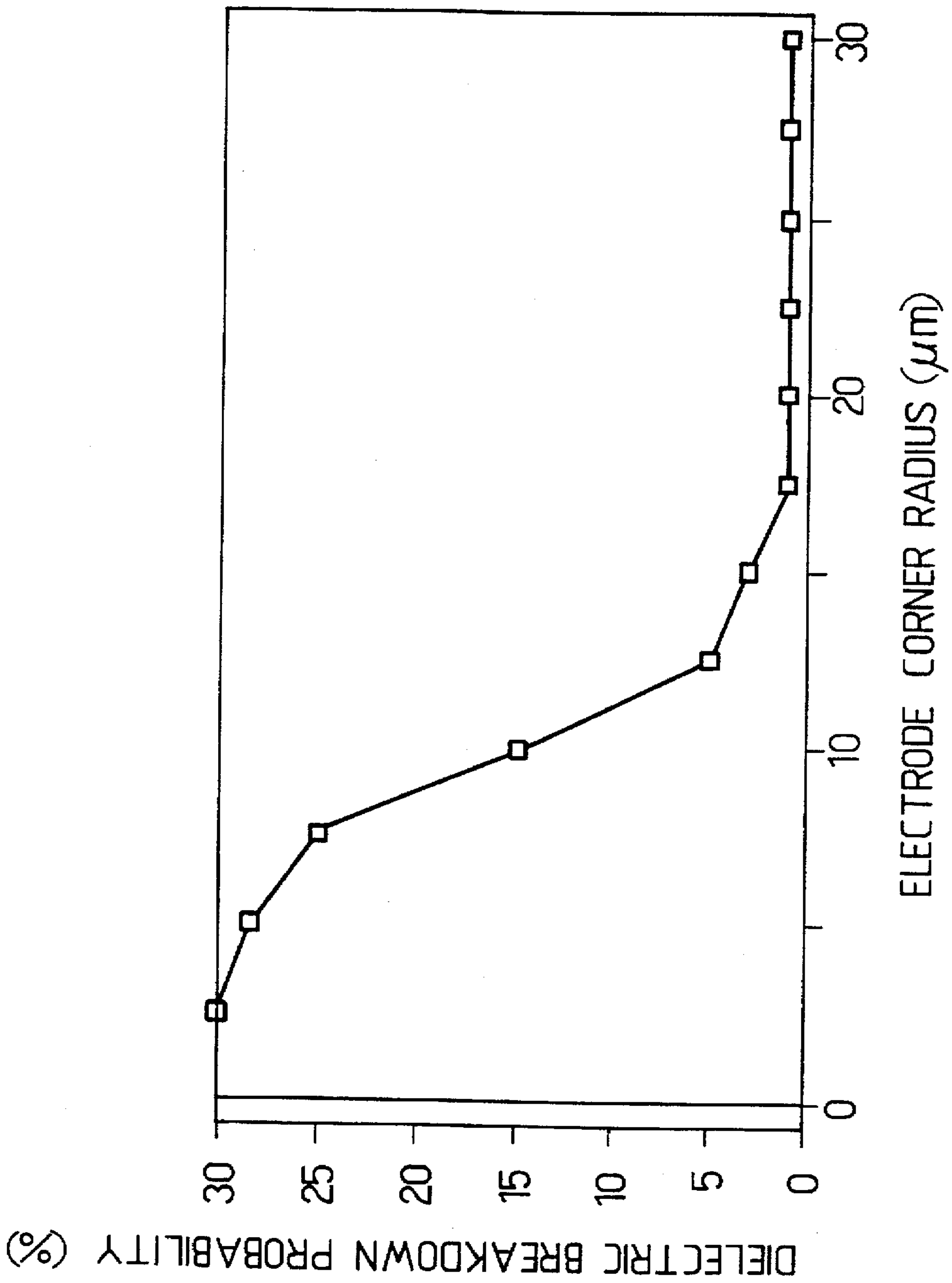
FIG. 9 is a graph showing the relation of the probability of occurrence of dielectric breakdown to the radius of corners of electrodes in the above embodiment.
Figure 10:
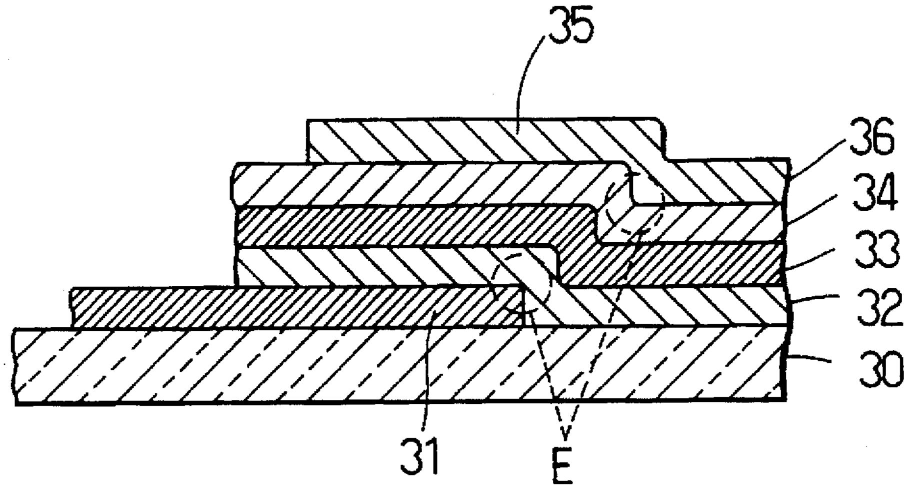
FIG.10 (PRIOR ART)
FIG. 10 is a fragmentary schematic cross sectional view of a prior art thin-film electroluminescent display element shown in FIG. 11.
Figure 11:
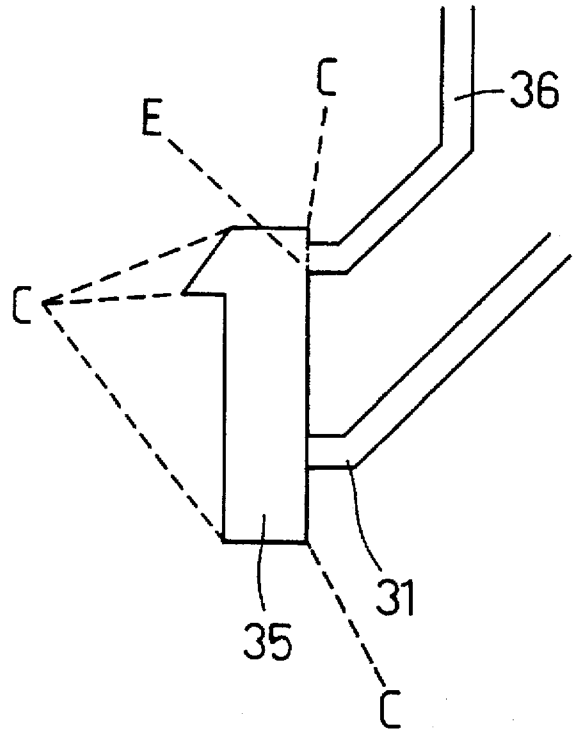
FIG.11 (PRIOR ART)
FIG. 11 is a plan view of a prior art thin-film electroluminescent display element structured as shown in FIG. 10.

FIG. 9 is a graph showing the relationship between the probability of occurrence of dielectric breakdown at the corners of the first and second electrodes 11 and 15, respectively, in the first thin-film electroluminescent display element 1 of the time display device fabricated by the method already described in connection with FIGS. 1–8 to the radius of the corners. As can be seen from this diagram, where the radius of the corners is set to 10 μm, the probability of occurrence of dielectric breakdown at the corners is reduced when 100 V is superimposed on the emission starting voltage of 200 V (which results in an emission brightness of 1 cd/$m^2$) at a frequency of 625 Hz. The probability of occurrence can be further reduced where the radius is set to more than 10 μm. The upper limit of the radius of circle of the corners is determined, taking account of the design of the first and second electrodes. Preferably, the upper limit is 1000 μm.

It is to be noted that the materials of the various layers forming the thin-film EL display elements of the time display device of the above embodiment are not limited to the above-described materials. Furthermore, these layers can be formed by methods other than the above-described methods. Also, in the above embodiment, each dielectric layer consists of two or three layers. Of course, each dielectric layer may consist of a single layer.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A thin-film electroluminescent display comprising:
- a substrate;
- a light-emitting element formed by a first electrode layer, a first dielectric layer, a luminescent layer, a second dielectric layer, and a second electrode layer laminated in that order on said substrate;
- said first electrode layer forming first electrodes having corners within a plane defined by said first electrode layer;
- said second electrode layer forming second electrodes having corners located within a plane defined by said second electrode layer, said corners of said second electrodes being located opposite to said corners of said first electrodes, said corners of said first and second electrodes opposite to each other being rounded with a radius larger than a predetermined value; and
- a voltage source applying a voltage between said first electrode layer and said second electrode layer to cause said luminescent layer to emit light.

2. The thin-film electroluminescent display of claim 1, wherein said predetermined value is 10 μm.

3. The thin-film electroluminescent display of claim 1, further comprising electrode connector portions connected to one of said first electrodes and said second electrodes via junction portions which are wider than said electrode connector portions.

4. The thin-film electroluminescent display of claim 1, wherein said first and second electrodes have shapes corresponding to segments of images to be displayed.

5. The thin-film electroluminescent display according to claim 1, wherein:
- said electroluminescent display has a display portion entirely containing said light-emitting element and a non-display portion separate from said display portion;
- said electrode connector portions extend to said non-display portion; and
- metallic conductive portions having a lower resistance than said electrode connector portions disposed on portions of said electrode connector portions located in said non-display portion.

6. The thin-film electroluminescent display of claim 1, wherein said substrate or substrates are transparent.

7. A thin-film electroluminescent display comprising:
- a first substrate;
- a first light-emitting element formed by a first electrode layer, a first dielectric layer, a luminescent layer, a second dielectric layer, and a second electrode layer laminated in that order on said first substrate;
- a second substrate;
- a second light-emitting element formed by a first electrode layer, a first dielectric layer, a luminescent layer, a second dielectric layer, and a second electrode layer laminated in this order on said second substrate;
- an inner space disposed between said first and second substrates in which said first and second light-emitting elements are located opposite to each other;
- sealing portions for sealing together said first and second substrates such that said inner space is hermetically isolated from an external environment;
- said first electrode layer forming first electrodes having corners within a plane defined by said first electrode layer;
- said second electrode layer forming second electrodes having corners located within a plane defined by said second electrode layer, said corners of said second electrodes being located opposite said corners of said first electrodes, said corners of said first and second electrodes opposite each other being rounded with a radius larger than a predetermined value; and
- a voltage source applying a voltage between said first electrode layer and said second electrode layer of each of said first and second light-emitting elements to cause said luminescent layers to emit light.

8. The thin-film electroluminescent display of claim 7, wherein said predetermined value is 10 μm.

9. The thin-film electroluminescent display of claim 8, wherein said first and second substrates have electrode connector portions connected with said first or second electrodes of each of said first and second light-emitting elements.

10. The thin-film electroluminescent display of claim 7, wherein said first and second substrates have electrode connector portions connected with said first or second electrodes of each of said first and second light-emitting elements.

11. The thin-film electroluminescent display of claim 7, wherein at least one of said first and second substrates is transparent.

12. The thin-film electroluminescent display of claim 1, wherein said rounded corners join portions of their respective electrodes having straight sides in said planes defined by said electrode layers.

13. The thin-film electroluminescent display of claim 1, wherein said rounded corners are located opposite to one another in planes perpendicular to said planes defined by said electrode layers.

14. The thin-film electroluminescent display of claim 1, wherein each of said first electrodes corresponds to one of said second electrodes and is capable of causing said light emitting layer to generate light only with said corresponding one of said second electrodes.

15. The thin-film electroluminescent display of claim 1, wherein each of the first electrodes corresponds to one of said second electrodes and has a same shape as its corresponding second electrode.

16. The thin-film electroluminescent display of claim 7, wherein said rounded corners join portions of their respective electrodes having straight sides in said planes defined by said electrode layers.

17. The thin-film electroluminescent display of claim 7, wherein said rounded corners are located opposite to one another in planes perpendicular to said planes defined by said electrode layers.

18. The thin-film electroluminescent display of claim 7, wherein each of said first electrodes corresponds to one of said second electrodes and is capable of causing said light emitting layer to generate light only with said corresponding one of said second electrodes.

19. The thin-film electroluminescent display of claim 7, wherein each of the first electrodes corresponds to one of said second electrodes and has a same shape as its corresponding second electrode.

* * * * *